US012347898B2

(12) United States Patent
Berisha et al.

(10) Patent No.: US 12,347,898 B2
(45) Date of Patent: Jul. 1, 2025

(54) MEMBRANE HUMIDIFIER

(71) Applicant: MAHLE International GmbH, Stuttgart (DE)

(72) Inventors: Bashkim Berisha, Leonberg (DE); Samuel Kohler, Weil im Schoenbuch (DE); Michael Walz, Filderstadt (DE)

(73) Assignee: MAHLE International GmbH, Stuttgart (DE)

( * ) Notice: Subject to any disclaimer, the term of this patent is extended or adjusted under 35 U.S.C. 154(b) by 332 days.

(21) Appl. No.: 17/867,716

(22) Filed: Jul. 19, 2022

(65) Prior Publication Data

US 2023/0012761 A1 Jan. 19, 2023

(30) Foreign Application Priority Data

Jul. 13, 2021 (DE) ...................... 10 2021 207 425.1

(51) Int. Cl.
*H01M 8/04119* (2016.01)
*H01M 8/0273* (2016.01)

(52) U.S. Cl.
CPC ..... *H01M 8/04141* (2013.01); *H01M 8/0273* (2013.01)

(58) Field of Classification Search
CPC ......................... H01M 8/04141; H01M 8/0273
See application file for complete search history.

(56) References Cited

U.S. PATENT DOCUMENTS

| 5,084,220 A | 1/1992 | Moller |
| 11,245,121 B2 | 2/2022 | Guan |
| 2017/0222235 A1* | 8/2017 | Brinkmeier ....... H01M 8/04141 |
| 2018/0226672 A1* | 8/2018 | Naito ................. H01M 8/0273 |

FOREIGN PATENT DOCUMENTS

| DE | 3884928 T2 | 2/1994 | |
| DE | 102014006394 A1 | 11/2015 | |
| DE | 102018217322 A1 | 4/2020 | |
| DE | 102020119895 A1 | 2/2021 | |
| DE | 102019123534 A1 * | 3/2021 | ........ H01M 8/04119 |
| KR | 20220091205 A * | 12/2020 | ........ H01M 8/04149 |

* cited by examiner

*Primary Examiner* — Matthew T Martin
*Assistant Examiner* — Taylor Harrison Krone
(74) *Attorney, Agent, or Firm* — Barnes & Thornburg LLP

(57) ABSTRACT

A membrane humidifier has a housing and a membrane stack. The membrane stack includes two first stack sides aligned parallel to the assembly direction. The membrane humidifier has a sealing device with two first sealing frames, each with an inner sealing surface and an outer sealing surface. The housing has two first housing sealing surfaces. The first sealing frames are in sealing contact with the inner sealing surfaces on the first stack sides. The first sealing frames are in contact with the outer sealing surfaces on the first housing sealing surfaces. The outer sealing surfaces of the first sealing frames and the first housing sealing surfaces of the housing are each aligned at a mounting angle to the first stack sides and to the mounting direction that is not zero. In addition, an arrangement is provided which includes the membrane humidifier and the sealing device for the membrane humidifier.

10 Claims, 3 Drawing Sheets

MEMBRANE HUMIDIFIER

CROSS REFERENCE TO RELATED APPLICATIONS

This application claims priority to German patent application 10 2021 207 425.1, filed Jul. 13, 2021, the entire content of which is incorporated herein by reference.

TECHNICAL FIELD

The disclosure relates to a membrane humidifier for humidifying a dry cathode supply air using a humid cathode exhaust air in a fuel cell system. The disclosure also relates to an arrangement with a membrane stack and with a sealing device for the membrane humidifier.

BACKGROUND

A membrane humidifier in a fuel cell system is used to humidify a dry cathode supply air using a humid cathode exhaust air. The fuel cell system can be used in particular to drive vehicles. A membrane humidifier of this type usually comprises a housing and a membrane stack, which is accommodated in the housing and has a plurality of membranes stacked at a distance from one another. Channels are formed between the adjacent membranes of the membrane stack, through which the cathode supply air and the cathode exhaust air flow alternately. The membranes are impermeable to air and permeable to water vapor, so that the cathode supply air and the cathode exhaust air are separated by the membranes and the cathode supply air can still be humidified through the membranes with the cathode exhaust air. DE 10 2014 006 394 A1, for example, discloses the airtight separation of the cathode supply air and the cathode exhaust air in the housing of the membrane humidifier by means of a plurality of seals. The seals are in sealing contact both with the membrane stack and the housing. This makes assembly of the membrane humidifier more difficult, since the seals can be destroyed when the membrane stack is inserted into the housing.

SUMMARY

It is an object of the disclosure to provide an improved or at least alternative embodiment for a membrane humidifier of the generic type, in which the disadvantages described are overcome.

According to an aspect of the disclosure, the object is achieved by a membrane humidifier for humidifying a dry cathode supply air in a fuel cell system and an arrangement with a membrane stack and a sealing device for the membrane humidifier as described herein.

A membrane humidifier in a fuel cell system is used to humidify a dry cathode supply air using a humid cathode exhaust air. The membrane humidifier has a housing and a membrane stack inserted into the housing in the assembly direction. The membrane stack has two first stack sides through which fluid can flow, two second stack sides through which fluid can flow and two third airtight stack sides. The respective stack sides are each aligned parallel and opposite one another and the first stack sides are aligned parallel to the assembly direction. The membrane humidifier also has a sealing device with two first frame-like sealing frames. The respective first sealing frames run around the edges of the respective first stack sides. The respective first sealing frames also each have an inner sealing surface and an outer sealing surface opposite the inner sealing surface. The respective first sealing frames are in sealing contact with the respective inner sealing surfaces on the respective first stack sides. In addition, two first housing sealing surfaces are formed on the housing and the respective outer sealing surfaces of the respective first sealing frames are in sealing contact with the respective first housing sealing surfaces of the housing. According to the disclosure, the respective outer sealing surfaces of the respective first sealing frames and the respective first housing sealing surfaces of the housing are each aligned at a mounting angle to the respective associated first stack sides and to the mounting direction that is not zero.

The outer sealing surfaces of the respective first sealing frames and the respective first housing sealing surfaces of the housing are advantageously designed to be inclined in relation to the first stack sides and the assembly direction. In this way, the contact between the respective first sealing frame of the sealing device and the respective first housing sealing surfaces of the housing can only be established when the membrane stack is fully inserted in the housing in the assembly direction. As a result, the respective first sealing frames of the sealing device can be pressed non-destructively and without distortion between the housing and the membrane stack or between the respective first stack sides of the membrane stack and the respective first housing sealing surfaces of the housing. In other words, the membrane stack with the sealing device can be inserted into the housing with less effort and the respective first sealing frames are not exposed to any mechanical shearing forces. As a result, both the assembly of the membrane humidifier can be simplified and the sealing of the membrane humidifier can be improved.

The assembly direction is advantageously a direction in which the membrane stack is inserted into the housing. The assembly direction can advantageously be aligned parallel to a longitudinal direction or a longitudinal axis or a width direction or a width axis or a height direction or a height axis of the membrane stack. The longitudinal direction or the longitudinal axis and the width direction or the width axis and the height direction or the height axis of the membrane stack are each aligned perpendicular to one another. The longitudinal direction or the longitudinal axis and the width direction or the width axis and the height direction or the height axis of the membrane stack are each aligned parallel to the outer edges of the membrane stack.

The housing can advantageously have an opening for inserting the membrane stack with the sealing device into the housing. The opening can advantageously be aligned transversely to the assembly direction. The housing can advantageously have a closing cover, wherein the closing cover closes the housing airtight transversely to the mounting direction.

The membrane stack of the membrane humidifier can advantageously have a number of membranes, in particular a number of flat membranes. Supply air ducts for the cathode supply air and exhaust air ducts for the cathode exhaust air can advantageously be formed between the membranes of the membrane stack. The supply air ducts can advantageously be assigned to the respective first/second stack sides. Advantageously, the cathode supply air can flow through the membrane stack from the one first/second stack side to the other first/second stack side via the supply air ducts. The supply air ducts can advantageously be assigned to the respective first/second stack sides. The cathode supply air can advantageously flow through the membrane stack from the one first/second stack side to the other first/second stack side via the supply air ducts. The supply air ducts and the exhaust air ducts can advantageously be aligned perpendicular to one another in the membrane stack. The membranes of the membrane stack can advantageously be impermeable to air and permeable to water vapor. The cathode supply air and the cathode exhaust air can advantageously flow through the membrane stack without mixing. The cathode supply air can advantageously be humidified through the membranes by means of the cathode exhaust air in the membrane stack.

The respective first sealing frames can advantageously seal the respective first stack side from the other stack sides. As a result, two first air chambers can advantageously be formed in the housing between the respective first stack sides and the housing. Two second air chambers may be advantageously formed in the housing between the respective second stack sides and the housing. The respective first air chambers can be provided for the inflow and outflow of cathode supply air and the respective second air chambers can be provided for the inflow and outflow of cathode exhaust air or vice versa. Advantageously, the respective first air chambers can be connected to the outside via two first sockets and the respective second air chambers can be connected to the outside via two second sockets in a fluid-conducting manner.

Advantageously, the respective outer sealing surfaces of the respective first sealing frames can each be aligned at an angle to the respective inner sealing surfaces that is identical to the mounting angle. As a result, a thickness, defined transversely to the assembly direction, of the respective first sealing frame increases steadily counter to the assembly direction. In other words, the thickness of the respective first sealing frame can deviate in the assembly direction.

The respective outer sealing surfaces can advantageously be aligned to the respective associated stack sides and the assembly direction such that a width of the membrane stack defined perpendicularly to the respective first side surfaces increases steadily with the sealing device counter to the assembly direction. The membrane stack can be cuboid and the thickness of the sealing device or the respective first sealing frame can increase steadily parallel to the respective first stack sides and counter to the assembly direction.

The respective first housing sealing surfaces can advantageously be aligned at the mounting angle to the respective first stack sides and to the mounting direction such that a width of the housing defined perpendicularly to the respective first side surfaces increases steadily parallel to the respective first stack sides and counter to the mounting direction. The width of the housing can advantageously increase steadily counter to the assembly direction from an interior space of the housing to an opening provided for the assembly of the membrane stack.

The mounting angle can advantageously be between 1° and 60°, preferably between 5° and 30°.

Provision can advantageously be made for the sealing device to be formed integrally by a support frame and the first sealing frames on the support frame. The membrane stack is then accommodated in the support frame and the support frame is inserted into the housing in the assembly direction. The support frame can advantageously be molded from plastic.

It may advantageously be provided that the respective first sealing frames are partially formed by first elastic frame seals. The respective first frame seals are in sealing contact with the respective first housing sealing surfaces of the housing. The sealing effect of the respective first sealing frame can advantageously be reinforced by the elastic frame seals.

It can advantageously be provided that the sealing device has two second sealing frames and the respective second sealing frames run around the edges of the respective second stack sides. The respective first sealing frames also each have an inner sealing surface and an outer sealing surface opposite the inner sealing surface. The respective inner sealing surfaces are in sealing contact with the respective second stack sides and the respective outer sealing surfaces are in sealing contact with the housing. The respective outer sealing surfaces are each aligned parallel to the respective assigned second stack sides and to the assembly direction.

The respective second sealing frames can advantageously be designed to form the respective first sealing frames, with the exception of the inclined arrangement of the respective outer sealing surfaces. The respective second stack sides can advantageously be aligned transversely to the assembly direction. The opening can advantageously be aligned transversely to the assembly direction. In the case of the respective second sealing frame, the outer sealing surfaces can advantageously be aligned parallel to the inner sealing surfaces.

Two second housing sealing surfaces can advantageously be provided in the housing for the respective second sealing frame. The respective second sealing frames can then be in sealing contact with the respective outer sealing surfaces on the housing sealing surfaces of the housing. The respective second sealing frames can advantageously seal the respective second stack sides from the other stack sides of the membrane stack. Two second air chambers may be advantageously formed in the housing between the respective second stack sides and the housing.

It can advantageously be provided that the respective second sealing frames are formed integrally on the support frame. The respective first sealing frame and the respective second sealing frame can advantageously be formed integrally on the support frame. Two sealing plates can advantageously be formed on the support frame. The respective second sealing plates can advantageously be assigned to the respective third stack sides. The respective third sealing plates can advantageously stabilize the support frame.

Provision can advantageously be made for the membrane stack to have a plurality of membranes stacked on one another. The membranes can be aligned parallel to the assembly direction and stacked on one another in a stacking direction. In this embodiment, the first stack sides and the third stack sides of the membrane stack are aligned parallel to the assembly direction and the second stack sides of the membrane stack are aligned transversely to the assembly direction. In this embodiment, the mounting direction and the stacking direction are aligned transversely to each other.

The disclosure also relates to an arrangement with a membrane stack and a sealing device for the membrane humidifier described above. The membrane stack has two first stack sides through which fluid can flow, two second stack sides through which fluid can flow and two third airtight stack sides. The respective stack sides are each arranged parallel and opposite one another and the first stack sides are aligned parallel to the assembly direction. The sealing device has two first frame-like sealing frames and the respective first sealing frames run around the edges of the respective first stack sides. The respective first sealing frames also each have an inner sealing surface and an outer sealing surface opposite the inner sealing surface. The respective first sealing frames are in sealing contact with the respective inner sealing surfaces on the respective first stack sides. The respective outer sealing surfaces of the respective first sealing frames are each aligned at a mounting angle to the respective assigned first stack sides and to the mounting direction. The arrangement is designed for insertion into a housing of the membrane stack in a mounting direction. In order to avoid repetition, reference is made at this point to the above explanations.

Further important features and advantages of the disclosure will be apparent from the drawings, and the accompanying description of the figures based on the drawings.

It goes without saying that the features mentioned above and those to be explained below may be used not only in the combination indicated in each case, but also in other combinations or separately, without deviating from the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
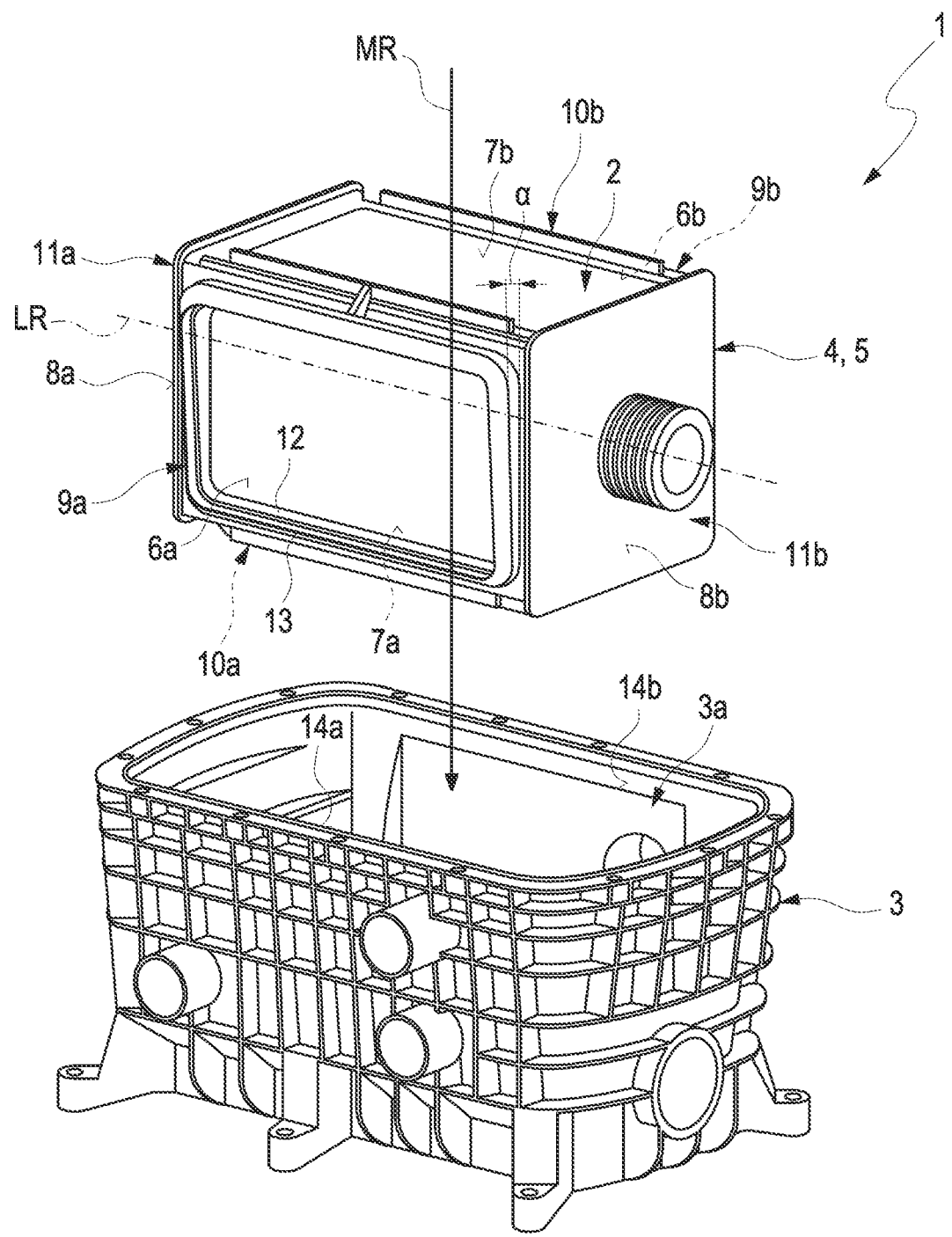
FIG. 1 shows an exploded view of a membrane humidifier according to a first exemplary embodiment of the disclosure without a closing cover.

FIG. 1 shows an exploded view of a membrane humidifier 1 according to a first exemplary embodiment of the disclosure. The membrane humidifier 1 has a membrane stack 2, a housing 3, and a sealing device 4 in the form of a support frame 5. The membrane stack 2 is arranged in the support frame 5 and the support frame 5 is inserted in the housing in a mounting direction MR through an opening 3a. The assembly direction MR is accordingly directed into the housing 3 from the outside. The opening 3a is aligned transversely to the mounting direction MR. The assembly direction MR is aligned transversely to a longitudinal direction LR of the membrane stack 2. The longitudinal direction LR is aligned parallel to the longest outer edge of the membrane stack 2.

The membrane stack 2 has two first stack sides 6a and 6b through which fluid can flow, two second stack sides 7a and 7b through which fluid can flow and two third airtight stack sides 8a and 8b. The respective stack sides 6a and 6b, 7a and 7b, 8a and 8b are each aligned parallel and opposite one another. The membrane stack 2 comprises a plurality of flat membranes which are aligned parallel to the assembly direction MR and transverse to the longitudinal direction LR of the membrane stack 2 in the membrane humidifier 1 in the first embodiment of the membrane humidifier 1. The first stack sides 6a, 6b are aligned parallel to the assembly direction MR and parallel to the longitudinal direction LR, the second stack sides 7a, 7b transverse to the assembly direction and parallel to the longitudinal direction LR, and the third stack sides 8a, 8b parallel to the assembly direction MR and transverse to the longitudinal direction LR. A stacking direction of the membranes is aligned parallel to the longitudinal direction LR of the membrane stack.

The sealing device 4 has two first sealing frames 9a, 9b and two second sealing frames 10a and 10b. The respective first sealing frames 9a, 9b run around the respective first stack sides 6a, 6b and the respective second sealing frames 10a, 10b run around the respective second stack sides 7a, 7b. In addition, the sealing device 4 has two sealing plates 11a, 11b, which are assigned to the respective third stack sides 8a, 8b. The sealing frames 9a, 9b, 10a, 10b and the sealing plates 11a, 11b are formed integrally with each other and form the support frame 5.

The respective sealing frames 9a, 9b, 10a, 10b each have an inner sealing surface 12 and an outer sealing surface 13. The respective sealing frame 9a, 9b, 10a, 10b is in sealing contact with its inner sealing surface 12 on the respective associated stack side 6a, 6b, 7a, 7b and with its outer sealing surface 13 on the housing 3. Two first housing sealing surfaces 14a, 14b for the respective first sealing frames 7a, 7b, and two second housing sealing surfaces—not visible here—for the respective second sealing frames 8a, 8b are formed in the housing. The one second housing sealing surface lies opposite the opening 3a within the housing 3 and the other second housing sealing surface is formed in a closing cover closing the opening 3a.

The membrane humidifier 1 is provided in a fuel cell system—for example a motor vehicle—to humidify a dry cathode supply air using a humid cathode exhaust air. The cathode supply air can be assigned to the first stack sides 6a, 6b and the cathode exhaust air can be assigned to the second stack sides 7a, 7b, or vice versa. The respective first and second sealing frames 9a, 9b and 10a, 10b seal the respective first and second stack sides 6a, 6b and 7a, 7b through which fluid can flow in the housing 3 from one another. As a result, the cathode supply air and the cathode exhaust air can flow through the membrane humidifier 1 without mixing. The membranes of the membrane stack 2 are airtight and permeable to water vapor, so that within the membrane stack 2 the dry cathode supply air can be humidified with the humid cathode exhaust air.

The outer sealing surfaces 13 of the respective first sealing frames 6a, 6b and the respective first housing sealing surfaces 14a, 14b of the housing 3 are each aligned at a mounting angle a to the respective assigned first stack sides 6a, 6b and to the mounting direction MR. As a result, the width of the diaphragm stack 2 and the housing 3 increases parallel to the first stack sides 6a, 6b counter to the assembly direction MR. As a result, the sealing frames 9a, 9b only come into contact with the associated housing sealing surfaces 14a, 14b when the diaphragm stack 2 with the support frame 5 is completely inserted in the housing 3. The diaphragm stack 2 with the sealing device 4 or with the support frame 5 can thus be inserted into the housing 3 with reduced force and the respective first sealing frames 9a, 9b are not subjected to mechanical shear forces. Since the respective second sealing frames 10a, 10b are aligned transversely to the assembly direction MR, they are not subjected to any mechanical shear forces during assembly in the same way. As a result, both the assembly of the membrane humidifier can be simplified and the sealing of the membrane humidifier 1 can be improved.

Figure 2:
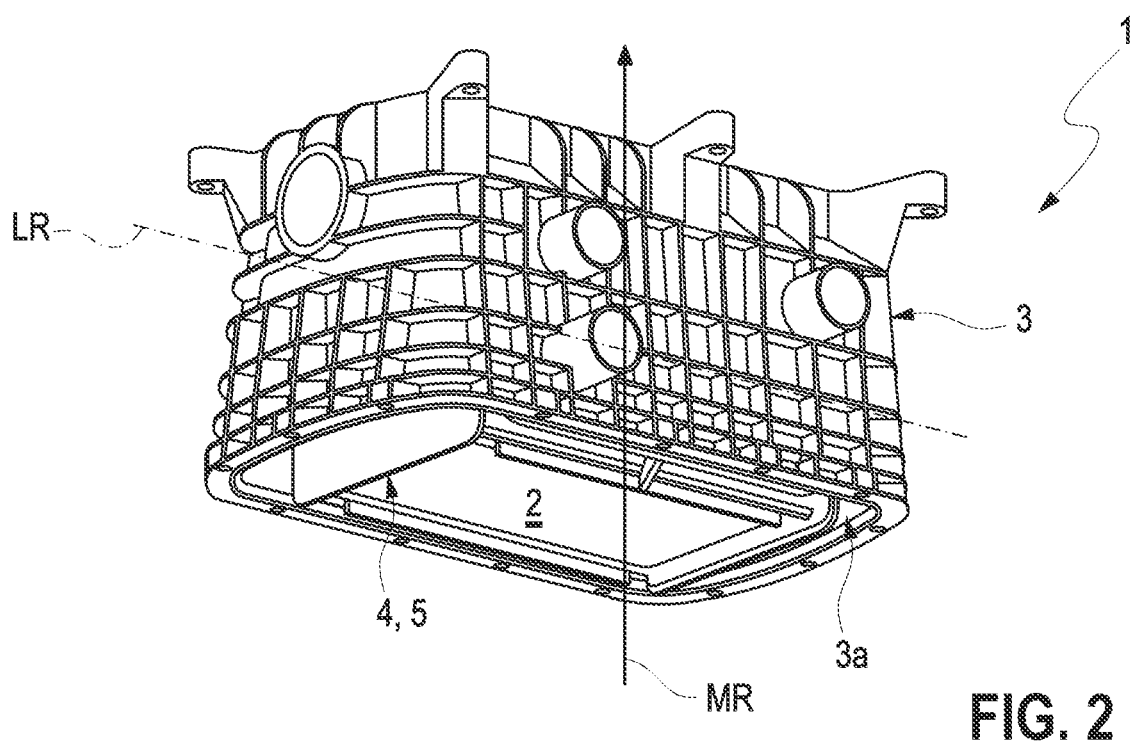
FIG. 2 shows a view of a membrane humidifier according to the first exemplary embodiment of the disclosure without a closing cover.

FIG. 2 shows a view of the membrane humidifier 1 according to the first exemplary embodiment of the disclosure. As can be seen here, the membrane stack 2 with the sealing device 4 or with the support frame 5 is inserted into the housing 3 in the assembly direction MR via the opening 3a.

Figure 3:
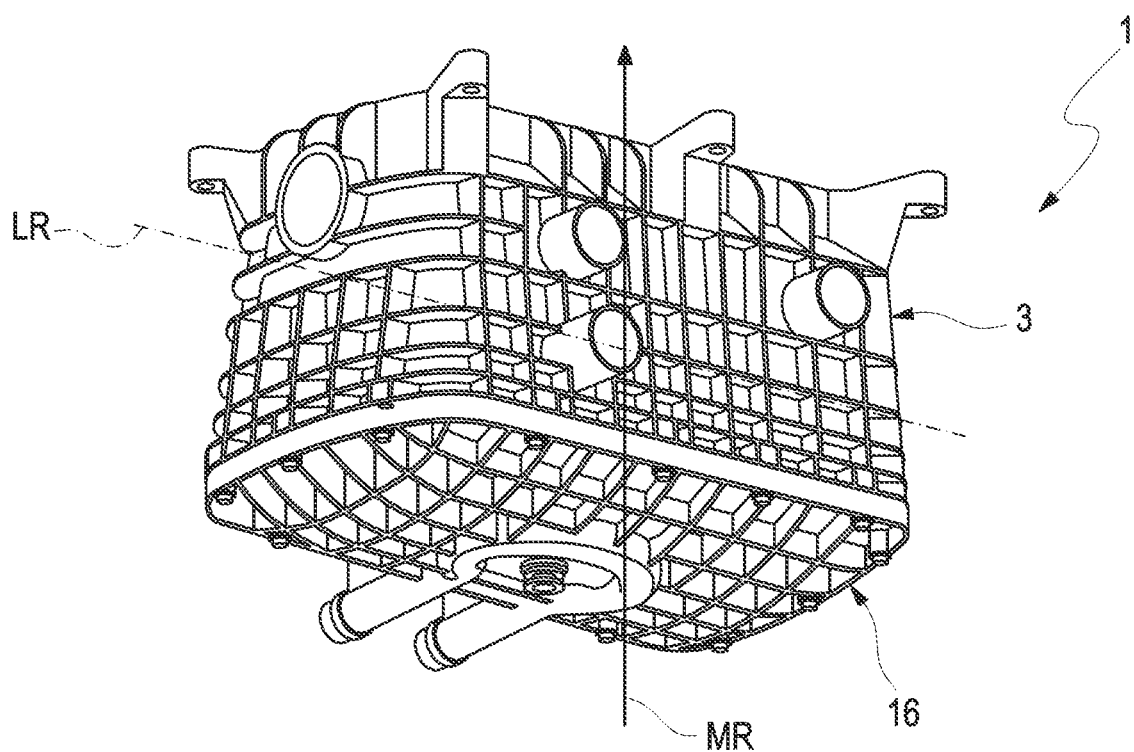
FIG. 3 shows a view of a membrane humidifier according to the first exemplary embodiment of the disclosure with a closing cover.

FIG. 3 shows a view of the membrane humidifier 1 according to the first exemplary embodiment of the disclosure. The opening 3a is closed here with a closing cover 16.

Figure 4:
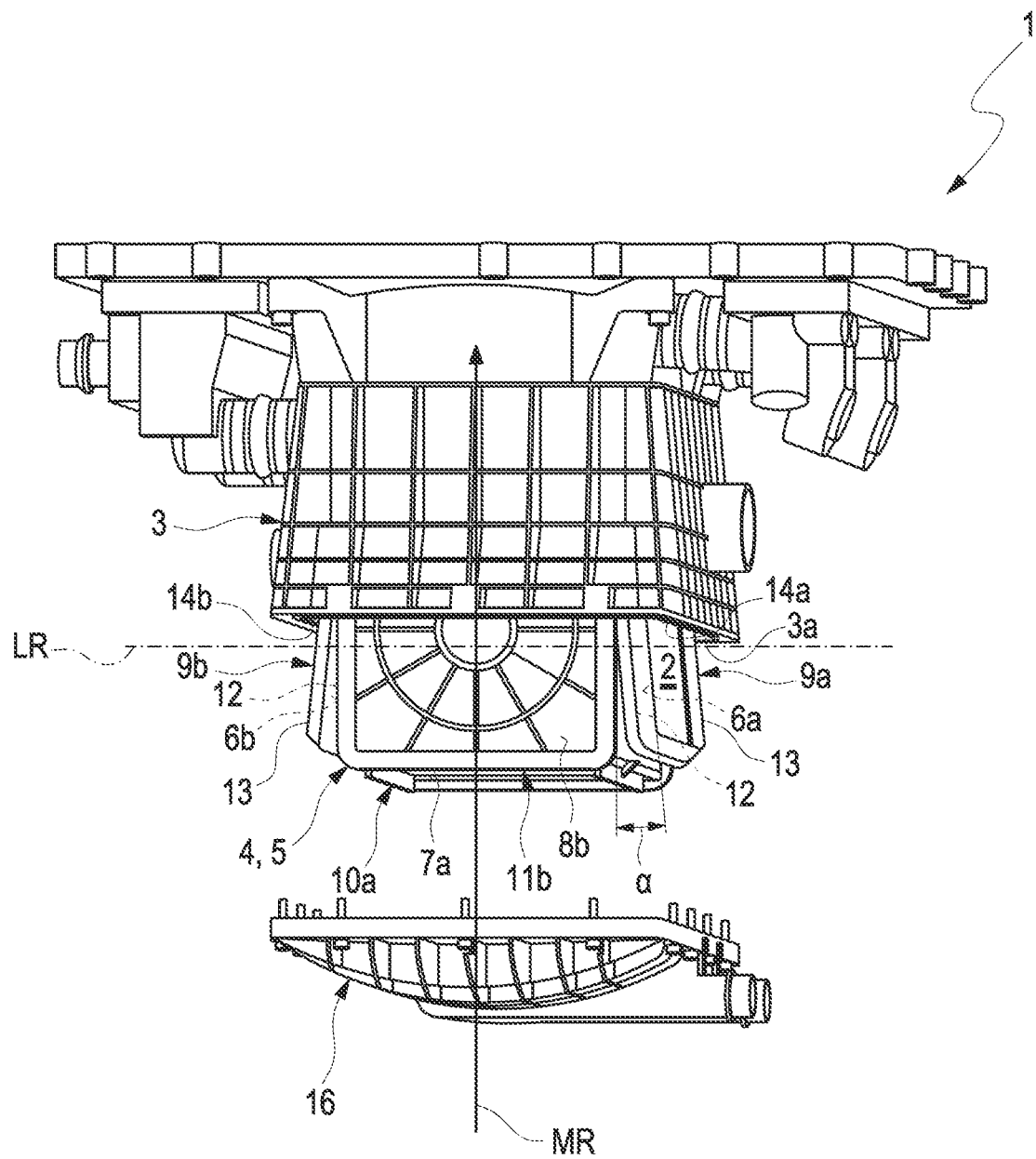
FIG. 4 shows an exploded view of the membrane humidifier according to a second exemplary embodiment of the disclosure.

FIG. 4 shows an exploded view of the membrane humidifier 1 according to a second exemplary embodiment of the disclosure. Deviating from the first exemplary embodiment of the membrane humidifier 1, the membranes of the membrane stack 2 are aligned parallel to the assembly direction MR and parallel to the longitudinal direction LR of the membrane stack 2. The first stack sides 6a, 6b are aligned parallel to the assembly direction MR and transverse to the longitudinal direction LR, the second stack sides 7a, 7b transverse to the assembly direction and parallel to the longitudinal direction LR, and the third stack sides 8a, 8b parallel to the assembly direction MR and parallel to the longitudinal direction LR. A stacking direction of the membranes is aligned here transversely to the assembly direction MR and transversely to the longitudinal direction LR of the membrane stack 2. For the rest, the second exemplary embodiment of the membrane humidifier 1 and the first exemplary embodiment of the membrane humidifier 1 match.

It is understood that the foregoing description is that of the exemplary embodiments of the disclosure and that various changes and modifications may be made thereto without departing from the spirit and scope of the disclosure as defined in the appended claims.

What is claimed is:

1. A membrane humidifier for humidifying a dry cathode supply air in a fuel cell system using a humid cathode exhaust air, the membrane humidifier comprising:
    a housing; and
    a membrane stack inserted into the housing in the assembly direction,
    wherein the membrane stack has two first stack sides through which fluid can flow, two second stack sides through which fluid can flow, and two third airtight stack sides,
    wherein the first stack sides are each aligned parallel and opposite one another, the second stack sides are each aligned parallel and opposite one another, the third stack sides are each aligned parallel and opposite one another, and the first stack sides are aligned parallel to the assembly direction,
    wherein the membrane humidifier has a sealing device with two first frame-like sealing frames, wherein each first frame-like sealing frame runs around the edges of one of the first stack sides,
    wherein each first frame-like sealing frame has an inner sealing surface and an outer sealing surface opposite the inner sealing surface,
    wherein the inner sealing surface of each first frame-like sealing frame is in sealing contact with a respective first stack side,
    wherein two first housing sealing surfaces are formed on the housing and a respective outer sealing surface of each first frame-like sealing frame is in sealing contact with a respective first housing sealing surfaces of the housing,
    wherein a respective outer sealing surface of each first frame-like sealing frame and the respective first housing sealing surfaces of the housing are each aligned at a mounting angle to the respective first stack side and to the mounting direction that is not zero, and
    wherein the outer sealing surface of each frame-like sealing frame is aligned at an angle to the respective inner sealing surfaces that is identical to the mounting angle such that a thickness of the respective first sealing frame defined transversely to the mounting direction increases steadily counter to the assembly direction.

2. The membrane humidifier of claim 1, wherein the respective outer sealing surfaces are aligned to the respective assigned stack sides and to the assembly direction such that a width of the membrane stack with the sealing device defined perpendicularly to the respective first stack sides increases steadily counter to the assembly direction.

3. The membrane humidifier of claim 1, wherein the respective first housing sealing surfaces are aligned at the mounting angle to the respective first stack sides and to the mounting direction such that a width of the housing defined perpendicular to the respective first stack sides steadily increases counter to the mounting direction.

4. The membrane humidifier of claim 1, wherein the mounting angle is between 1° and 60°, preferably between 5° and 30°.

5. The membrane humidifier of claim 1, wherein:
    the sealing device is formed integrally by a support frame and the first sealing frames are formed integrally on the support frame, and
    the membrane stack is accommodated in the support frame and the support frame is inserted into the housing in the mounting direction.

6. The membrane humidifier of claim 1, wherein the respective first sealing frames are partially formed by first elastic frame seals, the respective first frame seals being in sealing contact with the respective first housing sealing surfaces of the housing.

7. The membrane humidifier of claim 1, wherein:
    the sealing device has two second sealing frames and the respective second sealing frames run around the edges of the respective second stack sides,
    the respective second sealing frames each have an inner sealing surface and an outer sealing surface opposite the inner sealing surface,
    the respective inner sealing surfaces are in sealing contact with the respective second stack sides and the respective outer sealing surfaces on the housing, and
    the respective outer sealing surfaces are each aligned parallel to the respective assigned second stack sides and to the assembly direction.

8. The membrane humidifier of claim 7, wherein the respective second sealing frames are integrally formed on the support frame.

9. The membrane humidifier of claim 1, wherein the membrane stack has multiple membranes stacked on one another, which are aligned parallel to the assembly direction and stacked on one another in a stacking direction.

10. An arrangement, comprising:
    a membrane stack; and
    a sealing device for a membrane humidifier,
    wherein the membrane stack has two first stack sides through which fluid can flow, two second stack sides through which fluid can flow, and two third airtight stack sides,
    wherein the first stack sides are each aligned parallel and opposite one another, the second stack sides are each aligned parallel and opposite one another, the third stack sides are each aligned parallel and opposite one another, and the first stack sides are aligned parallel to the assembly direction,
    wherein the sealing device has two first frame-like sealing frames, wherein each first frame-like sealing frame runs around the edges of one of the first stack sides, wherein each first frame-like sealing frame has an inner sealing surface and an outer sealing surface opposite the inner sealing surface, wherein the inner sealing surface of each first frame-like sealing frame is in sealing contact with a respective first stack side, wherein the inner sealing surface of each first frame-like sealing frame is aligned parallel to the respective first stack side, and wherein a respective outer sealing surfaces of each first frame-like sealing frame are each aligned at a mounting angle to the respective first stack side and to the mounting direction, wherein the outer sealing surface of each first frame-like sealing frame is aligned at an angle to the respective inner sealing surfaces that is identical to the mounting angle such that a thickness of each first frame-like sealing frame defined transversely to the mounting direction increases steadily counter to the assembly direction, and wherein the arrangement is designed for insertion into a housing in a mounting direction.

* * * * *